United States Patent [19]

Georg et al.

[11] 4,162,103
[45] Jul. 24, 1979

[54] DRIVE ARRANGEMENTS FOR MINING MACHINES

[75] Inventors: Werner Georg; Walter Heberling, both of Lünen; Fritz Borgschulte, Bergkamen-Oberaden, all of Fed. Rep. of Germany

[73] Assignee: Gewerkschaft Eisenhutte Westfalia, Lünen, Fed. Rep. of Germany

[21] Appl. No.: 795,655

[22] Filed: May 10, 1977

[30] Foreign Application Priority Data

May 25, 1976 [DE] Fed. Rep. of Germany ....... 2623340

[51] Int. Cl.² .............................................. E21C 29/02
[52] U.S. Cl. ....................................... 299/43; 74/422; 105/29 R
[58] Field of Search .............. 105/29 R, 29 TL, 26 D; 74/31, 422; 299/43, 42

[56] References Cited

U.S. PATENT DOCUMENTS

| 901,975 | 10/1908 | Lynch | 105/29 R |
| 940,091 | 11/1909 | Trewhella | 74/422 |
| 1,027,073 | 5/1912 | Sessions et al. | 105/29 R |
| 1,710,801 | 4/1929 | Morgan | 299/34 |
| 3,753,596 | 8/1973 | Pentith | 299/43 |

FOREIGN PATENT DOCUMENTS 2574826  4/1976  Fed. Rep. of Germany ............ 299/43

Primary Examiner—William Pate, III
Attorney, Agent, or Firm—Neil F. Markva

[57] ABSTRACT

A mine working machine employs a main drive transmission with a vertical driven output shaft carrying a gearwheel which can be interchanged with a chain wheel for effecting a chain drive. For a chainless drive, an auxiliary transmission with a housing covering the gearwheel is attached to the machine body or the housing of the main drive transmission. The auxiliary transmission employs rotatable upstanding shafts located at the goaf side of the machine and in the auxiliary housing. The shafts carry gearwheels at their upper ends meshing with the driven gear wheel and pinions at their lower ends meshing with a multi-part rack extending along the path of movement of the machine.

17 Claims, 2 Drawing Figures

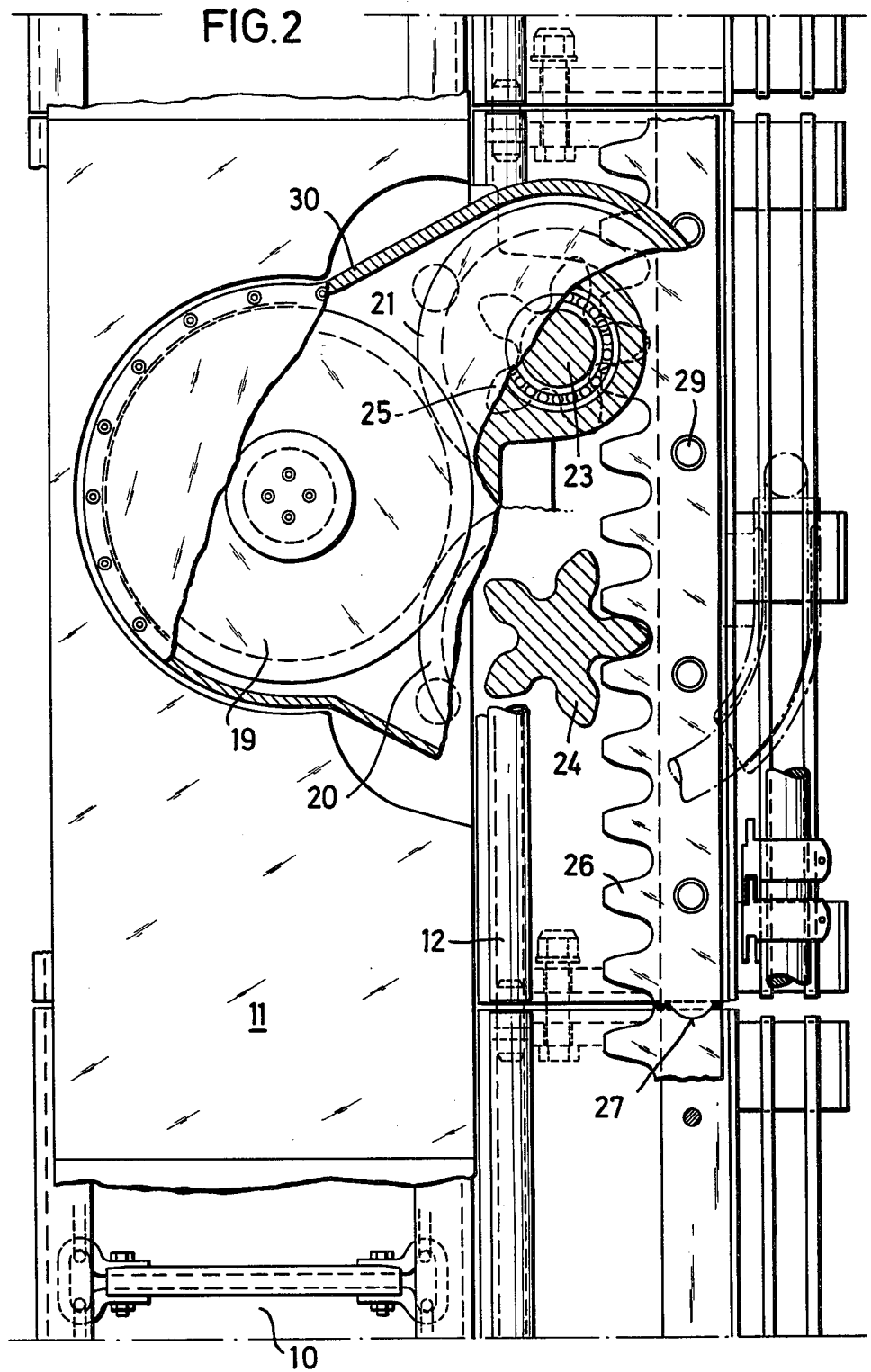

DRIVE ARRANGEMENTS FOR MINING MACHINES

BACKGROUND TO THE INVENTION

The present invention relates to mineral mining installations and more particularly to drive arrangements for mineral winning machines. It is well known in the mining art to employ a chain driven machine, such as a plough, which is moved back and forth along a mineral face. Normally the machine is guided by a guide on or at one side of a scraper chain conveyor composed of a series of channel sections or pans arranged end-to-end. Chainless drive systems for winning machines are also known. In one system of this type a toothed track or rack extends along the path of movement of the machine and a driven toothed wheel engages with the rack. To enable the installation to be shifted up in stages and to enable the installation to cope with unevenness in the floor it is usual to provide some limited mobility between the individual channel sections or pans of the conveyor. This requirement for mobility however causes serious problems with the known forms of chainless drives where a correct meshing between the track and the toothed wheel is needed. There is also a need, in general, for a drive system which is readily adaptable to chain and chainless drives without extensive work.

With regard to the foregoing a general object of the present invention is to provide an improved drive arrangement for a mineral winning machine.

SUMMARY OF THE INVENTION

In a drive arrangement for a mineral winning machine which employs a rack extending along the path of movement of the machine, the invention comprises plural pinions meshing with the rack and means for driving both pinions in the same direction.

According to the present invention there is also provided a drive arrangement for a mineral winning machine guided for movement back and forth along a mineral face. The arrangement is composed of a transmission housing supported by the machine. The housing contains first and second parallel shafts, bearings rotatably supporting said shafts and gear means mounted at one end of the shafts. Each of said gear means meshes with a common rack extending along the path of movement of the machine whereby the shafts can be driven in the same direction by drive means supported by the machine. The transmission housing is preferably detachably mounted to the top and to the goaf side of the body of the machine so that the entire transmission composed of the housing and the shafts with their bearings and gear means can be removed as a unit from the body. The term body of the machine is used here in a general sense and the body may in fact be a housing of the main drive means. The main drive means may employ a driven gear which drives the shafts. This driven gear can then be a replaceable item and by fitting a conventional chain wheel to the associated driven vertical shaft instead of the gear wheel and by removing the transmission unit the drive arrangement can be readily converted to a chain drive. The drive means and the vertical driven shaft may otherwise be of conventional design.

The common rack for receiving the gear means or pinions, usually at the lower end of the shafts, is preferably flexible and constructed from elongate sections interconnected in articulated manner. This provides the desired mobility and the design can be such that one of the pinions of the drive arrangement is properly meshed with the rack to propel the machine even if the other pinion is not properly meshed. Nevertheless, it is desirable to maintain the pinions relatively close together to ensure the drive and loading forces are properly distributed. With a view to further improving the flexibility of the drive and to avoid unduly high pressure on the flanks or teeth of the pinions, the shafts are preferably flexibly supported to allow relative flexure in the direction of movement of the machine and/or diagonally thereto. To achieve this, the bearings for the shafts may be mounted in elastic rings or the like. Gearwheels can be mounted at the upper ends of the shafts to mesh with the driven gear of the drive means. One or both these gear wheels meshing with the driven gear of the main drive means may also be flexibly mounted to again avoid unduly high pressures.

Although it is convenient for the shafts to be driven via a common driven gear it is also possible to utilize separate drives as for example hydromotors.

In a drive system for propelling a mineral winning machine along a toothed track or rack by a toothed wheel or the like engaging therewith, the invention includes a generally L-shaped auxiliary transmission housing detachably mounted to the machine and having a top section and a side section. First and second generally upstanding shafts are located in said side section of the housing and carry pinions at their lower ends and gear wheels at their upper ends. Both pinions mesh with the toothed track. Bearings are used to rotatably mount the shafts. A detachable gear wheel is mounted on a driven shaft of separate drive means and meshes with the gear wheels at the upper ends of the shafts within the top section of the housing. Thus, the auxiliary transmission housing, the shafts and their bearings can all be removed as a unit and the gearwheel on the driven shaft replaced by a chain wheel for effecting a conventional chain drive for the machine.

The invention may be understood more readily and various other features of the invention may become apparent from consideration of the following description.

BRIEF DESCRIPTION OF DRAWINGS

An embodiment of the invention will now be described, by way of example only, with reference to the accompanying drawings wherein:

FIG. 2 is a part-sectional plan view of the arrangement and installation depicted in FIG. 1;

DESCRIPTION OF PREFERRED EMBODIMENT

Figure 1:
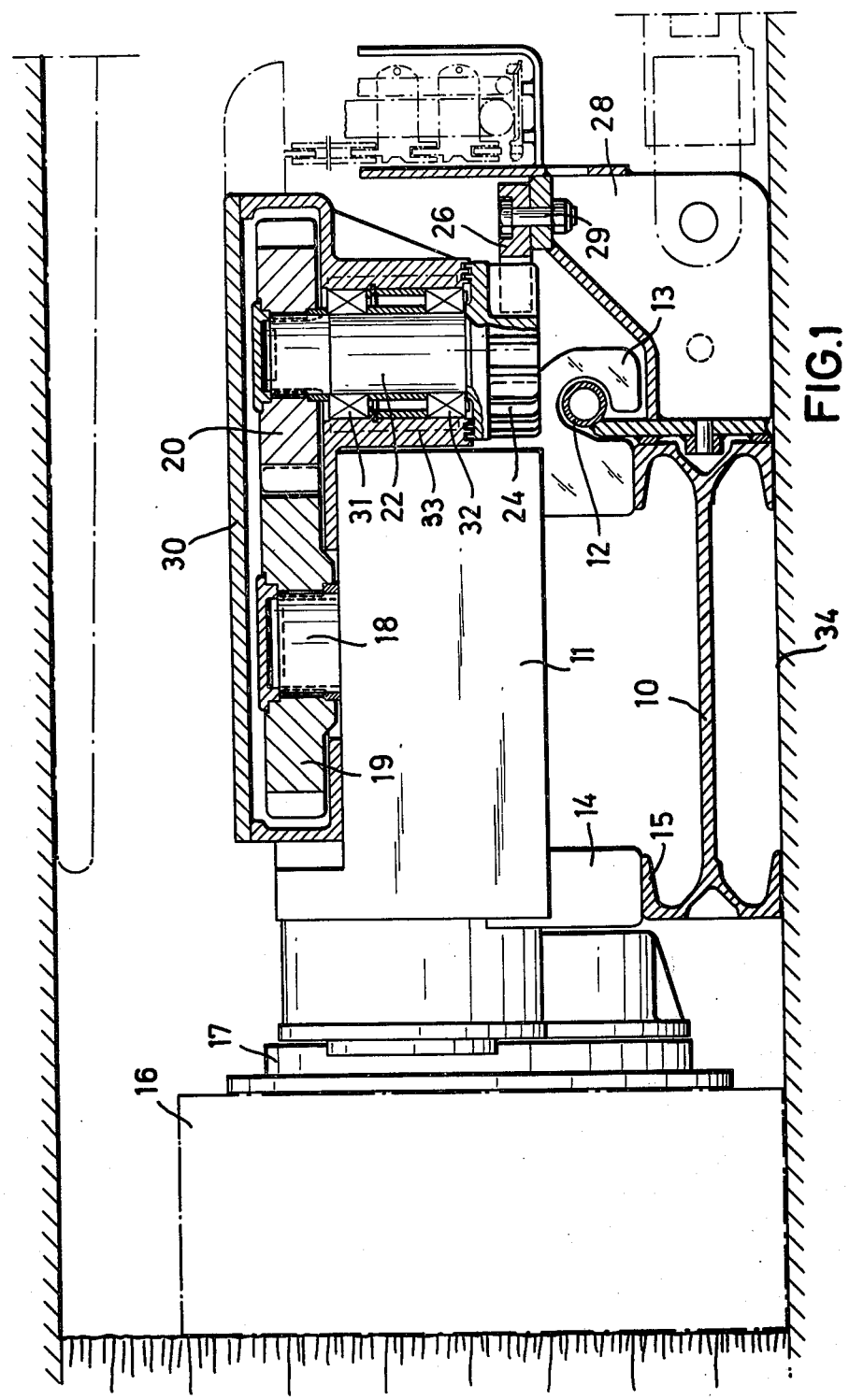
FIG. 1 is a part-sectional end view of a mineral mining installation employing a drive arrangement in accordance with the invention.

As shown in the drawings, a mineral mining installation, used particularly in longwall coal working, employs a scraper-chain conveyor 10 which is of known design. The conveyor 10 is constructed from individual channel sections or pans arranged end-to-end and along which is circulated a scraper-chain assembly partly depicted in FIG. 2. Each channel section or pan has generally sigma-shaped side walls adjoined by a floor and the channel sections of the conveyor 10 are interconnected to permit a certain degree of free mobility between the ends of the channel sections as is known per se.

A coal cutting machine 11 is supported on the conveyor channel sections which rest on the floor 34 of the working. As is also known the machine employs a shearer drum 16 mounted to the machine body with means 17 permitting the drum 16 to be raised or lowered. The body of the machine 11 carries drive means and the machine 11 is moved back and forth along the conveyor 10 to strip coal from the face with the aid of the shearer drum 16. The coal which is won in this manner is transported away by the conveyor 10. The conveyor 10 is shifted up from time-to-time by shifting means in accordance with the winning progress.

The body of the machine 11 has skids 14 which engage on the upper flanges of the side walls of the channel sections. At the goaf side remote from the coal face there is a guide 12 made up from rails affixed with attachments to the goaf side walls of the conveyor channel sections. The machine body has one or more guide blocks 13 which mate with the guide 12.

The drive arrangement of the invention will now be described. The drive means carried by the body of the machine may be of conventional design and has an upstanding driven output shaft 18. The drive arrangement comprises an auxiliary miter-gear transmission mounted in a detachable housing 30 which is mounted to the body of the machine 11 so as to be replaceable as a unit. The housing 30 is generally L-shaped with an upper section and a depending section engaging on the top and the goaf side of the body of the machine 11. As shown the arrangement has two upstanding stubshafts 22, 23 rotatably mounted in bearings 31, 32 in the depending part of the housing 30. The lower ends of the shafts 22, 23 carry pinions 24, 25 respectively which mesh with a common rack 26 extending along the conveyor 10. The upper ends of the shafts 22, 23 carry gears 20, 21 respectively which mesh with a gear wheel 19 detachably supported on the drive shaft 18. As shown, drive shaft 18 is substantially parallel to shafts 22, 23 which are located in a plane that is laterally spaced from shaft 18. The gears 20, 21 and gearwheel 19 are located in the upper section of the housing 30. The bearings 31, 32 are preferably supported in flexible rings or the like as indicated by the dotted lines 33 in FIG. 1 to permit the shafts 22, 23 to flex in a plane parallel to the floor 34. In this way, the pinions 24, 25 can mesh with the rack 26 in a manner whereby unduly high forces between the flanks of the teeth of the pinions 24, 25 and the rack 26 can be avoided. The flexible mounting for the shafts 22, 23 can be adapted so that the shafts 22, 23 can only move relative to one another in a direction parallel to th rack 26. The rack 26 is assembled from individual elongate sections each of which may have a length approximately the same as that of the channel sections of the conveyor 10 so that each channel section has one rack section allocated to it. The rack sections have interengaging projections and recesses at their ends which form balland-socket type joints 27 (FIG. 2) permitting a certain degree of limited freedom of movement between the rack sections. The rack sections are detachably secured to brackets 28 arranged at the goaf sides of the conveyor channel sections with the aid of screws 29.

As can be readily appreciated, rotation of the drive shaft 18 will be transmitted to the pinions 24, 25 which will propel the entire machine along the rack 26. The entire auxiliary transmission can be removed however by disconnecting the housing 30 and the shafts 22, 23 etc., and the gearwheel 19 can be removed from the shaft 18 and replaced by a conventional chain wheel for a chain drive.

We claim:

1. In a drive system for propelling a mineral winning machine along a toothed track by a driven toothed wheel engaging said toothed track, said machine having a cutter, a body and transmission assembly, said assembly comprising:
    (a) a generally L-shaped auxiliary transmission housing detachably mounted to the machine and having a top section and a side section,
    (b) first and second generally upstanding shafts located in said side section of the housing,
    (c) said shafts carrying pinions at their lower ends and gearwheels at their upper ends,
    (d) both said pinions being effective to mesh with said track,
    (e) bearings for rotatably mounting the shafts, and
    (f) a detachable drive gearwheel located in said top section and mounted on a drive shaft of separate drive means and directly meshing with the gearwheels at the upper ends of the shafts within the top section of the housing,
    (g) said auxiliary transmission being removably disposed as a unit from said body.

2. A driven system according to claim 1, wherein the auxiliary transmission comprises miter gearing.

3. A driven arrangement according to claim 2, wherein the housing is mounted to the top and to the side of the body of the machine remote from the mineral face.

4. A driven arrangement according to claim 2, wherein:
    the common drive gearwheel is replaceable, and
    the transmission housing with the shafts and their bearings and gear means is detachable from the machine.

5. A drive arrangement according to claim 2, wherein the bearings for at least one of the shafts permit relative flexure between the shafts.

6. A drive arrangement according to claim 2, wherein the rack is flexible and constructed from elongate sections movably interconnected together.

7. A drive arrangement for a mineral winning machine guided for movement back and forth along a mineral face, said machine having a cutter and a body, said arrangement comprising:
    (a) a transmission housing removably supported by the body of said machine,
    (b) said housing containing transmission means including first and second upstanding parallel shafts and bearings rotatably supporting said shafts,
    (c) first gear means mounted at the lower end of each of the shafts,
    (d) each of said first gear means drivably meshing with a common multi-part rack extending along the path of movement of the machine,
    (e) second gear means mounted within said housing at the upper end of each of the shafts, and
    (f) the second gear means both meshing directly with a common gearwheel mounted within said housing and driven by drive means.

8. A mineral winning machine movable along a common rack arranged alongside a mineral face; said machine having a drive arrangement for propelling the machine along the rack, a cutter, and a body, said drive arrangement comprising:
    (a) a first upstanding rotatably driven shaft, (b) a first toothed gear carried by said first driven shaft, (c) second and third upstanding rotatable stub shafts which are disposed in a place that is laterally spaced from said driven shaft, (d) second and third toothed gears at the lower ends of the stub shafts drivably meshing with said rack, (e) fourth and fifth toothed gears at the upper end of the stub shafts meshing with said first toothed gear, (f) bearing means flexibly and rotatably supporting said stub shafts to permit the axes of rotation of the stub shafts to move to a limited extent, and (g) a housing removably supported on said body of the machine and containing the stub shafts and the first, fourth and fifth toothed gears.

9. A transmission assembly for a mineral winning machine guided along a rack for movement back and forth along a mineral face, said machine having a cutter and a body, said assembly comprising:

(a) a transmission housing detachably supported by the body of the machine, (b) first and second parallel shafts rotatably supported by bearings in said housing, (c) gear means mounted at one end of the shafts being meshed with said rack extending along the path of movement of the machine, and (d) drive means supported by the machine and located in said housing to rotate the shafts in the same direction.

10. A drive arrangement according to claim 9, wherein the gear means at said one end of the shafts comprise pinions.

11. A drive arrangement according to claim 9, wherein:

said drive means includes a driven gear and gearwheels, and said gear wheels are provided at the other ends of the shafts and mesh with said driven gear.

12. A drive arrangement according to claim 9, wherein the shafts and their gear means rotate about vertical axes.

13. A drive arrangement according to claim 9, wherein:

said drive means includes a driven gear and further gear means, and said further gear means is provided at the other ends of the shafts and the further gear means mesh with said driven gear of the drive means.

14. An assembly according to claim 9 wherein: the housing is mounted to the top and to the side of the body of the machine remote from the mineral face.

15. An assembly according to claim 1, wherein:

said drive means includes the motor of the winning machine, and said drive shaft comprises the output shaft of said winning machine motor.

16. An assembly according to claim 11, wherein:

the drive shaft is substantially parallel to said upstanding shafts.

17. A mineral winning machine movable along a common rack arranged alongside a mineral face; said machine comprising:

(a) a main body having an upper surface and side surfaces, (b) a first upstanding shaft supported for rotation by said body, (c) a first toothed gear detachably carried by the upper end of the first shaft and located above the upper surface of the body, (d) drive means within the body for rotating the first shaft and the first toothed gear, (e) second and third upstanding rotatable stub shafts located adjacent one of the side surfaces of the body, (f) bearing means mounting said second and third stub shafts for rotation, (g) second and third toothed gears mounted to the lower ends of the second and third stub shafts, respectively, and drivably meshing with said rack, (h) fourth and fifth toothed gears mounted to the upper ends of the second and third stub shafts, respectively, and drivably meshing with said first toothed gear, and (i) an L-shaped housing detachably mounted to the body, (j) the housing having an upper section generally enclosing the first, fourth, and fifth toothed gears and a side section supporting said bearing means, (k) said housing generally enclosing the second and third stub shafts, (l) the housing, the second and third stub shafts and the first to fifth toothed gears constituting a unit which is detachable from the body as a unitary structure to permit a chain wheel to be mounted to the upper end of the first shaft for conversion to an alternative different drive arrangement for the machine.

* * * * *